(12) United States Patent
Mohamed et al.

(10) Patent No.: US 10,487,907 B1
(45) Date of Patent: Nov. 26, 2019

(54) BRACKET ARRANGEMENT FOR SUPPORTING THE WELD AREA OF A POLE

(71) Applicant: Valmont Industries Inc., Omaha, NE (US)

(72) Inventors: Diaaeldin Mohamed, La Vista, NE (US); Anthony J. Hansen, Elkhorn, NE (US); Shannon R. Eggert, Lincoln, NE (US)

(73) Assignee: Valmont Industries Inc., Omaha, NE (US)

( * ) Notice: Subject to any disclaimer, the term of this patent is extended or adjusted under 35 U.S.C. 154(b) by 0 days.

(21) Appl. No.: 15/443,296

(22) Filed: Feb. 27, 2017

Related U.S. Application Data

(60) Provisional application No. 62/334,178, filed on May 10, 2016.

(51) Int. Cl.

| | |
|---|---|
| *F16F 15/08* | (2006.01) |
| *F16L 13/06* | (2006.01) |
| *E04H 12/22* | (2006.01) |
| *F16F 1/373* | (2006.01) |
| *F16M 13/02* | (2006.01) |
| *F16L 3/10* | (2006.01) |
| *F16L 55/172* | (2006.01) |
| *F16L 55/035* | (2006.01) |

(52) U.S. Cl.
CPC ......... *F16F 15/08* (2013.01); *E04H 12/2292* (2013.01); *F16F 1/3732* (2013.01); *F16L 13/06* (2013.01); *F16M 13/02* (2013.01); *E04H 12/22* (2013.01); *E04H 12/2253* (2013.01); *F16L 3/1091* (2013.01); *F16L 55/035* (2013.01); *F16L 55/172* (2013.01)

(58) Field of Classification Search
CPC ....... F16L 13/06; F16L 55/035; F16L 55/172; F16L 3/1091; B29C 66/20; E04H 12/24; E04H 12/20; E04H 12/2261; E04H 12/08; E04H 12/16; E04H 12/22; E04H 12/2253; E04H 12/2269; E04H 12/2292
USPC ....... 248/49, 62, 74.1, 74.4, 205.1, 511, 519
See application file for complete search history.

(56) References Cited

U.S. PATENT DOCUMENTS

| | | | | |
|---|---|---|---|---|
| 2,608,369 A | * | 8/1952 | Hocher | E04H 12/24 248/201 |
| 2,731,227 A | * | 1/1956 | Anderson | E04H 12/24 248/219.1 |
| 4,078,867 A | * | 3/1978 | Ronden | E01F 9/629 404/10 |
| 4,429,849 A | * | 2/1984 | Maier | E04G 21/1833 248/156 |
| 4,575,129 A | * | 3/1986 | Porowski | F16L 21/007 138/97 |

(Continued)

*Primary Examiner* — Jonathan Liu
*Assistant Examiner* — Taylor L Morris
(74) *Attorney, Agent, or Firm* — Duncan Galloway Egan Greenwald PLLC; Theresa Camoriano; Guillermo Camoriano

(57) ABSTRACT

A bracket arrangement for supporting an elongated pole element that is welded to a base flange. The bracket arrangement surrounds the elongated pole element at a first position and spans from the first position to a second position that is secured at a point beyond the weld area. An energy-absorbing element lies between the bracket and the elongated pole element at the first position to dampen vibrations.

4 Claims, 10 Drawing Sheets

(56) References Cited

U.S. PATENT DOCUMENTS

| | | | | |
|---|---|---|---|---|
| 5,014,940 A * | 5/1991 | Sherman | | F16L 3/04 248/62 |
| 5,205,529 A * | 4/1993 | Killian | | B62D 27/02 248/636 |
| 5,215,281 A * | 6/1993 | Sherman | | F16L 3/1207 248/219.4 |
| 5,261,633 A * | 11/1993 | Mastro | | F16L 3/18 248/68.1 |
| 5,468,025 A * | 11/1995 | Adinolfe | | F16L 21/08 285/114 |
| 5,601,274 A * | 2/1997 | Minor | | F16F 13/00 248/219.1 |
| 6,293,593 B1 * | 9/2001 | Wivagg | | F16L 55/168 285/15 |
| 6,595,560 B1 * | 7/2003 | Guitoneau | | F16L 21/06 285/114 |
| 6,705,058 B1 * | 3/2004 | Foust | | E04C 3/32 52/296 |
| 6,799,607 B1 * | 10/2004 | Friedline | | F16L 3/085 138/106 |
| 6,820,389 B1 * | 11/2004 | Macchietto | | E04C 3/32 248/156 |
| 7,044,449 B2 * | 5/2006 | Wink | | E04H 12/2215 248/156 |
| 7,617,963 B1 * | 11/2009 | Jensen | | F16L 3/1226 228/44.5 |
| 7,685,791 B2 * | 3/2010 | Nahlen | | E04H 12/24 248/219.3 |
| 7,694,476 B2 * | 4/2010 | Cook | | E04H 12/085 52/296 |
| 7,997,541 B2 * | 8/2011 | Pothanikat | | F16L 55/035 248/560 |
| 8,756,874 B2 * | 6/2014 | Hurlebaus | | E04H 12/24 52/223.8 |
| 2003/0026923 A1 * | 2/2003 | Al-Zoubi | | E04H 12/20 428/34.1 |
| 2008/0205578 A1 * | 8/2008 | Abura | | G21C 15/25 376/372 |
| 2009/0134203 A1 * | 5/2009 | Domec | | B23K 20/123 228/112.1 |
| 2011/0101177 A1 * | 5/2011 | Suganuma | | F16L 3/06 248/74.1 |
| 2013/0175422 A1 * | 7/2013 | Clarke | | E04H 12/2269 248/523 |
| 2015/0021447 A1 * | 1/2015 | Hirst | | F16L 3/015 248/60 |
| 2015/0322689 A1 * | 11/2015 | Niidome | | E04H 12/22 248/530 |
| 2017/0276261 A1 * | 9/2017 | Hargrave | | F16L 3/1058 |

* cited by examiner

US 10,487,907 B1

BRACKET ARRANGEMENT FOR SUPPORTING THE WELD AREA OF A POLE

This application claims priority from U.S. Provisional Application Ser. 62/334,178 filed May 10, 2016.

BACKGROUND

The present invention relates to a bracket arrangement for supporting the weld area of an elongated body, such as a pole, which extends off a base, off a foundation, or even off another pole. More particularly, it relates to a bracket arrangement that also includes a vibration dampening element.

Static spikes (also referred to as static dischargers) are elongated bodies that often are installed atop buildings or tall poles in order to harmlessly dispel static electricity charges. Static spikes typically are schedule 40 metal poles, 2-inches in diameter, and between 10 feet and 25 feet long. The static spike is welded to a flange which is then bolted onto the distal end of the structure to be protected (the roof of a building or the top of a tall pole, for instance). Unfortunately, the static spike acts like a vertical sail. Wind blows past the static spike and causes a condition called vortex shedding, which is an oscillating flow that takes place when a fluid such as air or water flows past a body at certain velocities. During vortex shedding, vortices are created at the back of the body (in this case the static spike) and detach periodically from either side of the body. The fluid flow past the body creates alternating low-pressure vortices on the downstream side of the body. The body will tend to move toward the low-pressure zone. If the body is not mounted rigidly and the frequency of vortex shedding matches the resonance frequency of the body, the body can begin to resonate, vibrating with harmonic oscillations driven by the energy of the flow. This vibration can ultimately lead to the stress fracture of the weld joint between the body (the static spike) and its supporting flange, resulting in fatigue failure at the weld joint.

SUMMARY

An embodiment of the present invention provides a bracket which rigidly connects the elongated body (such as the static spike) to its support structure (either to the flange or to the base or foundation to which the flange is bolted). The bracket spans the weld area between the elongated body and the flange. In a preferred embodiment, a visco-elastic vibration dampening element is introduced between the bracket and the elongated element to further attenuate any vortex-shedding harmonic oscillations. This bracket arrangement may be part of a new installation or can be retrofitted to existing installations.

DESCRIPTION

Figure 1:
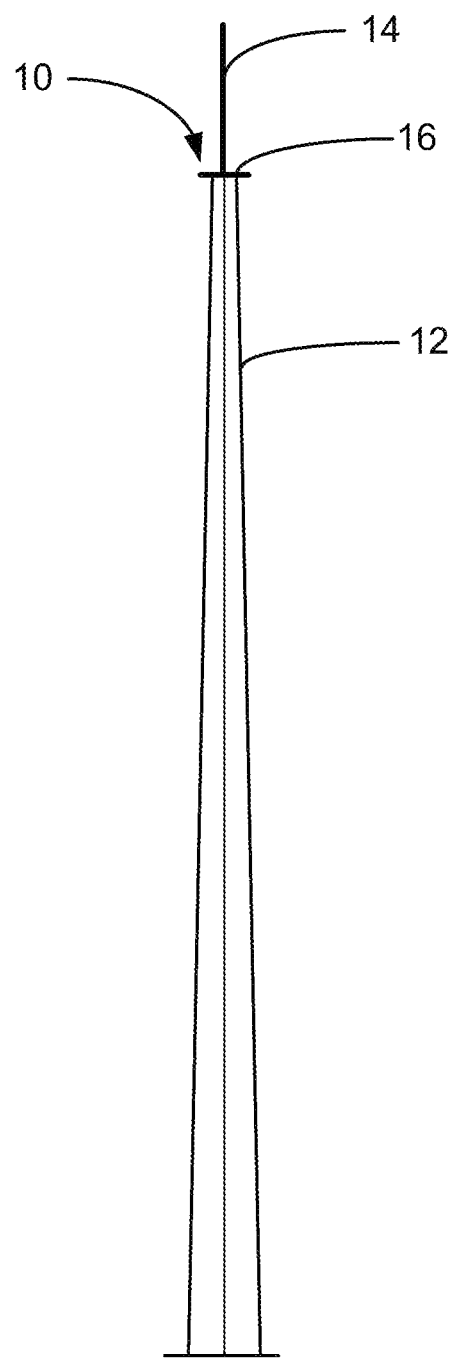
FIG. 1 is a view of a base pole with a static spike mounted atop the pole.

FIGS. 1-5 show a first embodiment of a bracket arrangement 10. As shown in FIG. 1, a tall, steel, base pole 12, such as may be found at an electrical utility substation, has a static spike (an elongated pole element) 14 attached to the top of the base pole 12. In this example, the base pole 12 is approximately 85 feet tall, and the static spike 14 is approximately 10 feet tall. Static spikes are usually 2-inch diameter, schedule 40 steel pipe and are between 10 and 25 feet tall. The pole element or spike 14 is welded to a base flange 16, at the base of the spike 14. The base flange 16 is in turn bolted to a corresponding pole flange 17 (See FIG. 2) welded to the top of the base pole 12.

Referring now to FIGS. 2-5, the proximal end of the static spike 14 is welded to the flange 16 along the weld joint 18. As indicated earlier, the base flange 16 is bolted to the pole flange 17 utilizing the bolts 20 and nuts 22. In this embodiment of the bracket arrangement 10, the proximal ends of two "L" shaped elongated bracket elements 24 are bolted to the base flange 16 using the same bolts 20 and nuts 22 used to secure the base flange 16 to the pole flange 17. A semi-cylindrical bracket element 26 is secured, as by welding, to the distal end 28 of each of the elongated bracket elements 24.

The semi-cylindrical brackets 26 are mounted transversely to the longitudinal direction of the elongated elements 24, and each semi-cylindrical bracket 26 defines front and rear ear projections 30. Holes through the front and rear ear projections 30 on one of the semi-cylindrical brackets 26 align with holes through the corresponding front and rear ear projections 30 on the other semi-cylindrical bracket 26 to receive bolts 34, which are secured by nuts 32 to clamp the two semi-cylindrical brackets 26 together and to press the two semi-cylindrical brackets 26 against the static spike 14 to secure the distal ends 28 of the corresponding elongated elements 24 to the static spike 14.

It should be noted that, in a preferred embodiment, the overall length of the bracket is between 5% and 15%, and preferably approximately 10%, of the overall length of the static spike 14 in the elongated direction. So, for a 10 foot long static spike 14, the preferred distance from the top of the base flange 16 (or the bottom of the "L-shaped" elongated element 24) to the top of the semi-cylindrical brackets 26 is between 6 inches and 18 inches, with the most preferred distance being approximately 12 inches.

It also should be noted that, in this embodiment, an energy-absorbing element 36 made of a visco-elastic polymer material is sandwiched between each of the semi-cylindrical brackets 26 and the static spike 14. Visco-elastic materials have both high viscosity and high elasticity. They absorb vibration and give off the energy absorbed as heat. In this embodiment, the energy-absorbing element 36 is made of a material called Sorbothane®, manufactured by Sorbothane, Incorporated of Kent, Ohio. Sorbothane® is a thermoset, polyether-based, polyurethane material. In addition to being visco-elastic, Sorbothane® also has a very high damping coefficient. It combines shock absorption, good memory, vibration isolation, and vibration damping characteristics, and combines all of these characteristics in a stable material with a long fatigue life. It exhibits a low creep rate compared to other polymers and absorbs shocks efficiently for millions of cycles. Some of the physical properties for Sorbothane® are listed below:

| Property | Value | Unit | Code |
|---|---|---|---|
| Maximum Tensile Strength | 170 | psi | ASTM D 412-06a |
| Maximum Elongation | 154 | % | ASTM D 412-06a |
| Compression Set | 3 | % | ASTM D 395 |
| Tear Strength | 31 | lb/in | ASTM D 624-00, Die C |
| Bulk Modulus | 4.14 | gPascal | — |
| Density | 79.6 | lb/ft$^3$ | ASTME D 792-13 |
| Specific Gravity | 1.318 | — | ASTME D 792-13 |
| Poisson's Ratio | 0.5427 | — | — |
| Optimum Performance Temperature Range | −20° to +160° | ° F. | — |
| Bacterial Resistance | No Growth | — | ASTM G 21-09 |
| Fungal Resistance | No Growth | — | ASTM G 22 |
| Flash Ignition Flammability | 570° | ° F. | — |
| Self Ignition Flammability | 750° | ° F. | — |
| Heat Aging | Stable | — | — |
| Dielectric Strength | 273 | V/ml | ASTM D 149-13, Method A |
| Dynamic Young's Modulus | 305 | psi | — |
| Ultraviolet Resistance | Good | — | — |
| Acoustic Properties: Transmission Loss in Air | greater than 40 | decibel/cm | — |

In the figures, the energy-absorbing element 36 is shown as a cylinder with an inside diameter slightly larger than the outside diameter of the static spike 14 and an outside diameter sized to be pressed by the semi-cylindrical brackets 26 of the bracket arrangement 10 when the semi-cylindrical brackets 26 are clamped together by the bolts 34 and nuts 32. In the embodiment of FIGS. 1-5, the energy-absorbing element 36 is continuous and is installed by sliding it down the static spike 14 from the top of the static spike 14 until it is at the correct height to be clamped by the semi-cylindrical brackets 26. The energy-absorbing element 36 is placed in the correct position on the static spike 14 before the semi-cylindrical brackets 26 are bolted together to surround the energy-absorbing element 36. Of course, it also is possible to provide the energy-absorbing element 36 in two or more semi-cylindrical segments such that the installation would not require sliding the element 36 along the length of the static spike 14.

In this particular embodiment, the energy-absorbing element 36 is ¼ inch thick and 6 inches long and completely surrounds the static spike 14. The elongated elements 24 and semi-cylindrical brackets 26 and ears 30 are made out of ½ inch thick steel.

It should be noted that the bracket arrangement 10 connects, supports, strengthens, stiffens, and dampens the static spike 14 by providing a brace from a first point on the static spike 14 to a second point fixed relative to the base flange 16 (which may be referred to as a base or a foundation) and located beyond the weld area 18 of the base flange 16 to the static spike 14. That is, the bracket arrangement 10 spans across the weld area 18 so as to attenuate any vibration at the weld area 18. This reduces or eliminates stress cracking of the weld and fatigue failure of the part.

Figure 2:
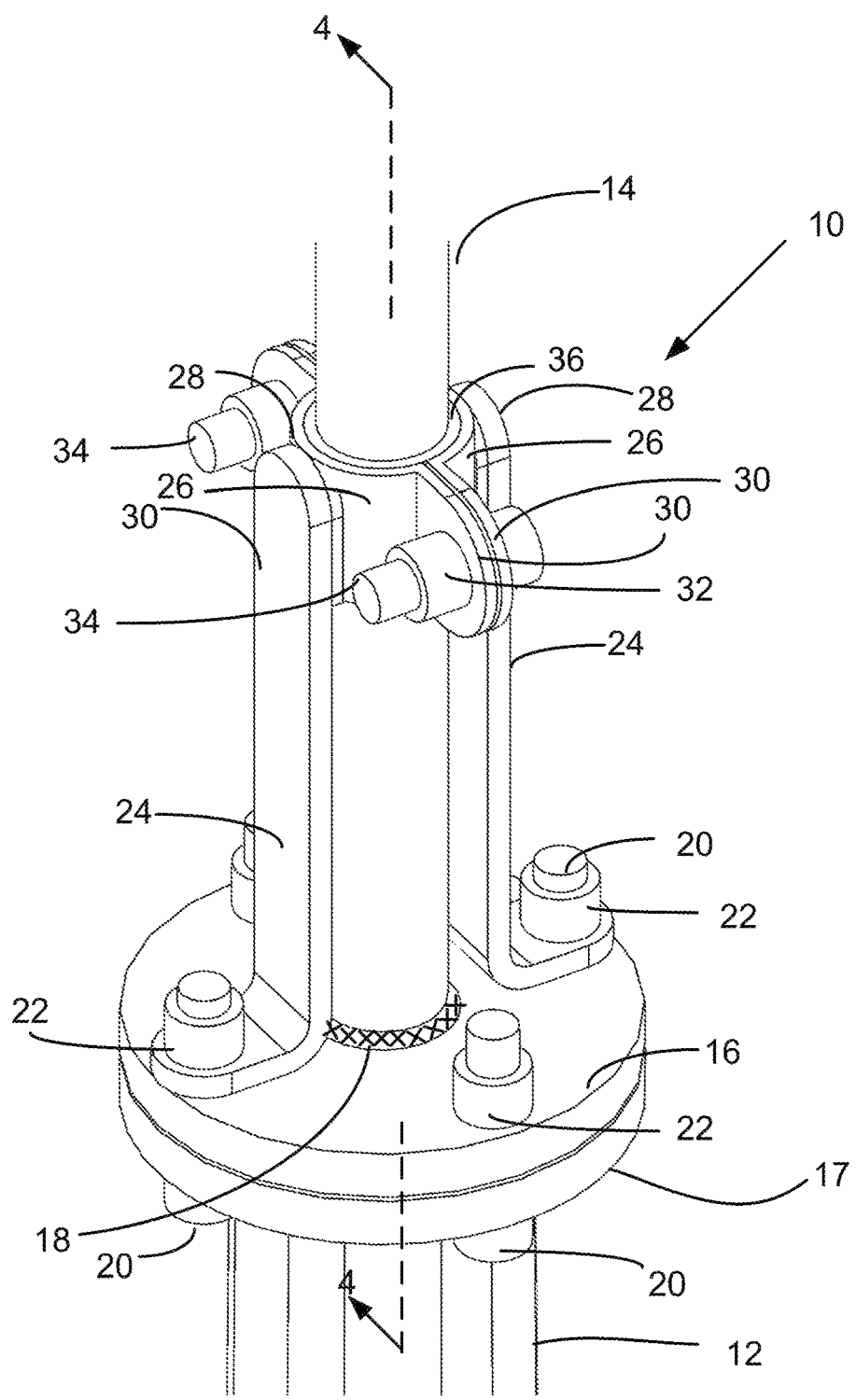
FIG. 2 is a broken-away, close-up view of the static spike of FIG. 1, focusing on a bracket arrangement connecting the static spike to a flange.
Figure 3:
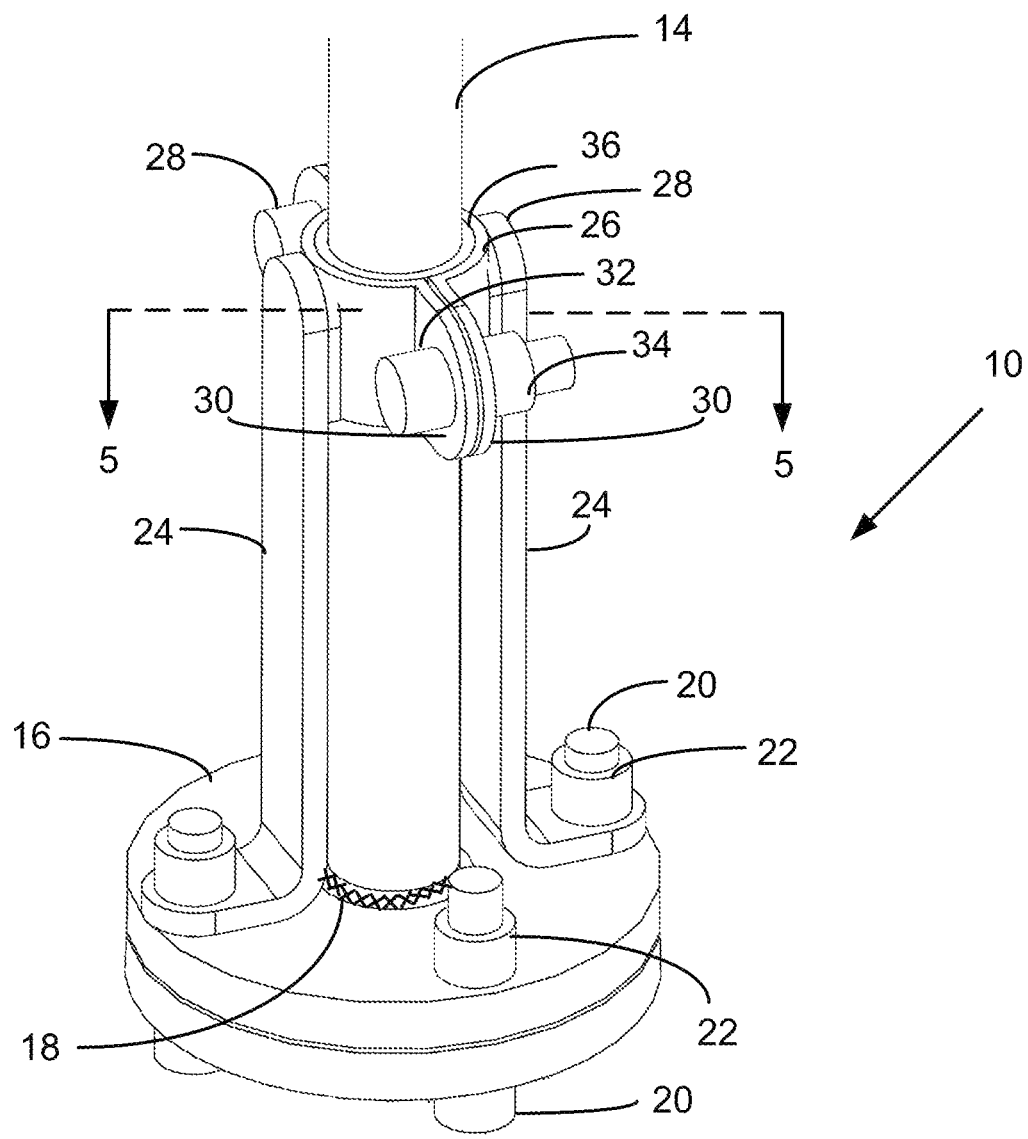
FIG. 3 is the same view as FIG. 2 but rotated approximately 180 degrees about the longitudinal axis, and with the mating flange and base pole not shown.
Figure 4:
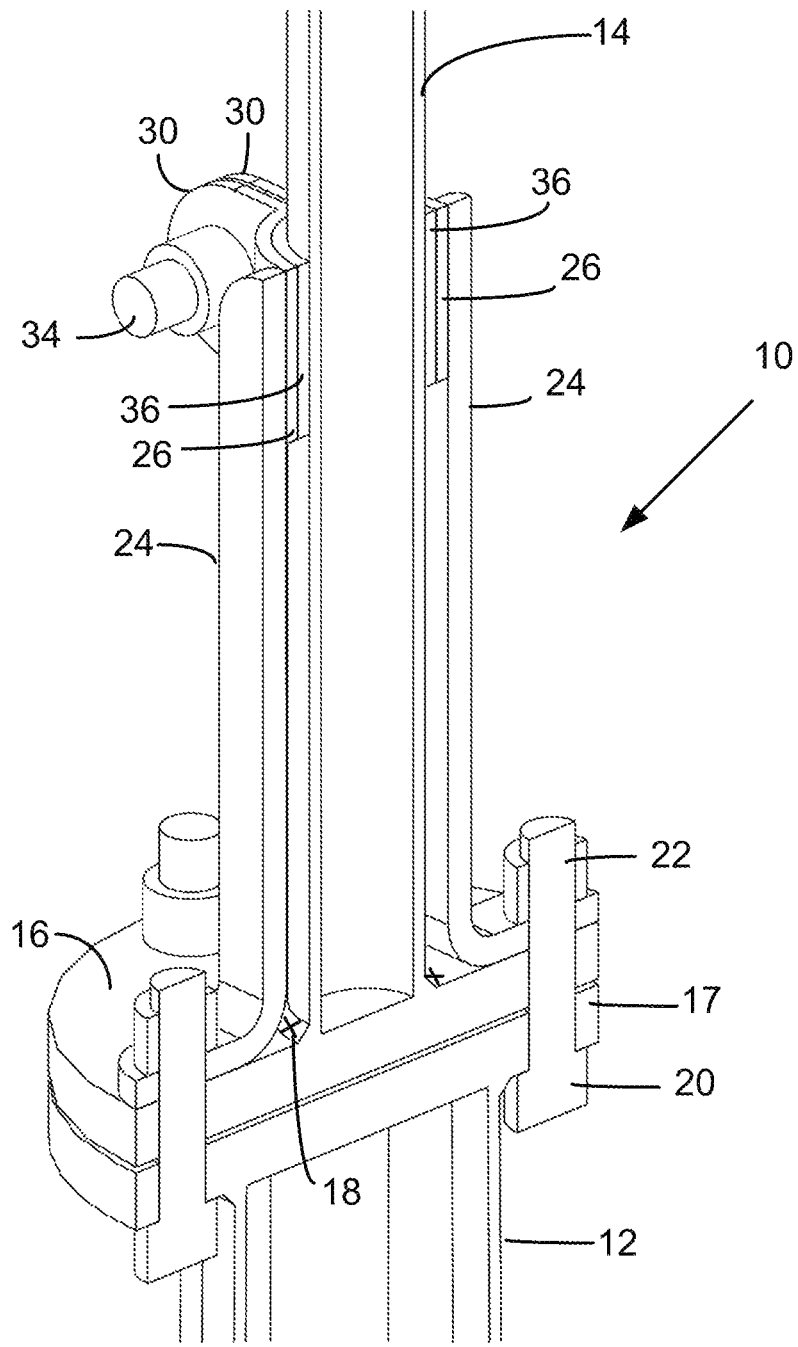
FIG. 4 is a section view along line 4-4 of FIG. 2.
Figure 5:
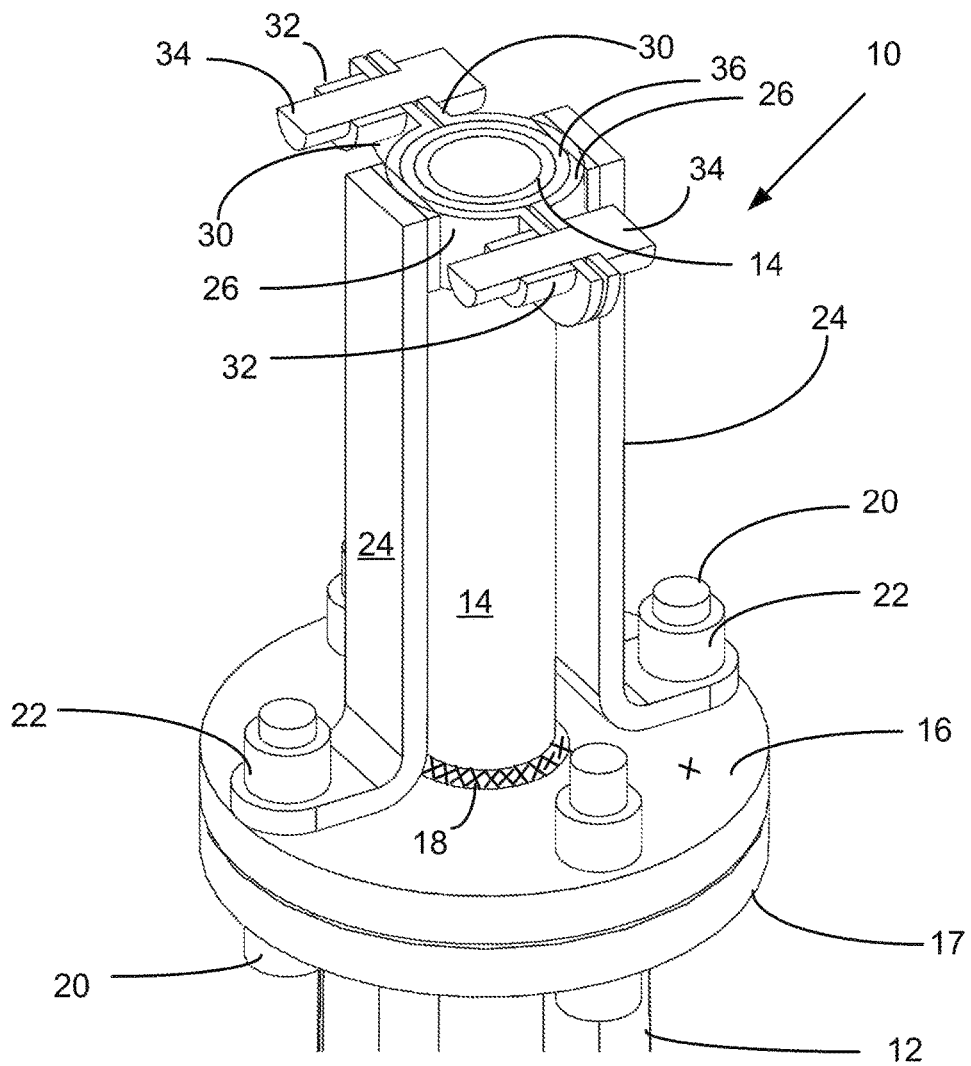
FIG. 5 is a section view along line 5-5 of FIG. 3.

It also should be noted that the bracket arrangement 10 easily may be retrofitted to an existing installation by removing two opposing bolts 20 securing the base flange 16 to the base pole 12, installing two of the elongated "L-shaped" elements 24 such that their proximal ends rest on and are secured to the flange 16 via the bolts 20 (which have just been removed and reinserted for that purpose), and bolting the semi-cylindrical brackets 26 together with the nuts 32 and bolts 34, as shown in FIGS. 2 and 3, while ensuring that the energy-absorbing element 36 is inserted and sandwiched between the semi-cylindrical brackets 26. It is understood that the bracket arrangement 10 need not be secured via the bolts as described above. For instance, the elongated elements 24 may be welded directly to the flange 16. It is also understood that the bracket arrangement 10 may be secured to the flange or base 16 by more than just two of the bolts 20, if desired.

Thus, the bracket arrangement 10 provides a rigid member that is independently fixed at a first position (the position of the semi-cylindrical brackets 26) by means of the bolts 34 and nuts 32, spans across the weld line 18, and is independently fixed relative to the base flange 16 at a second position by means of the bolts 20 and nuts 22. By being independently fixed at the first and second positions, the rigid member may be unfixed at the first position, such as by removing the bolts and nuts 34, 32, without affecting the fixing at the second position. Similarly, the rigid member may be unfixed at the second position, such as by removing the bolts and nuts 20, 22 without affecting the fixing at the first position. Welding the elongated elements 24 directly to the flange 16, as suggested above as an alternative arrangement, would be another way of independently fixing the rigid member at the second position. In that case, if the weld that connects the elongated element 24 to the flange 16 were cut off to undo the fixing at the second end, it would not affect the fixing at the first end.

Figure 6:
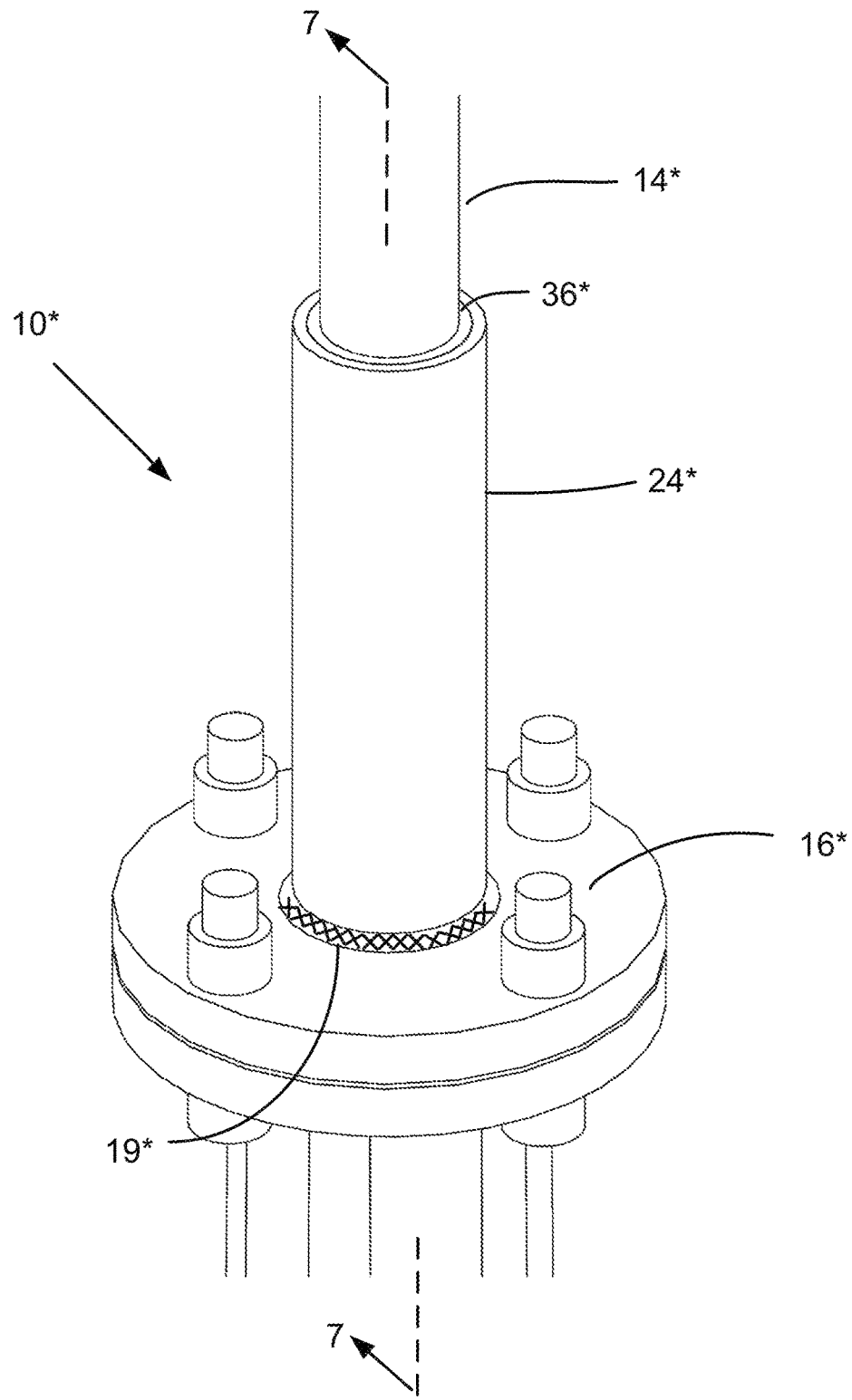
FIG. 6 is similar to FIG. 2, but showing a second embodiment of a bracket arrangement.
Figure 7:
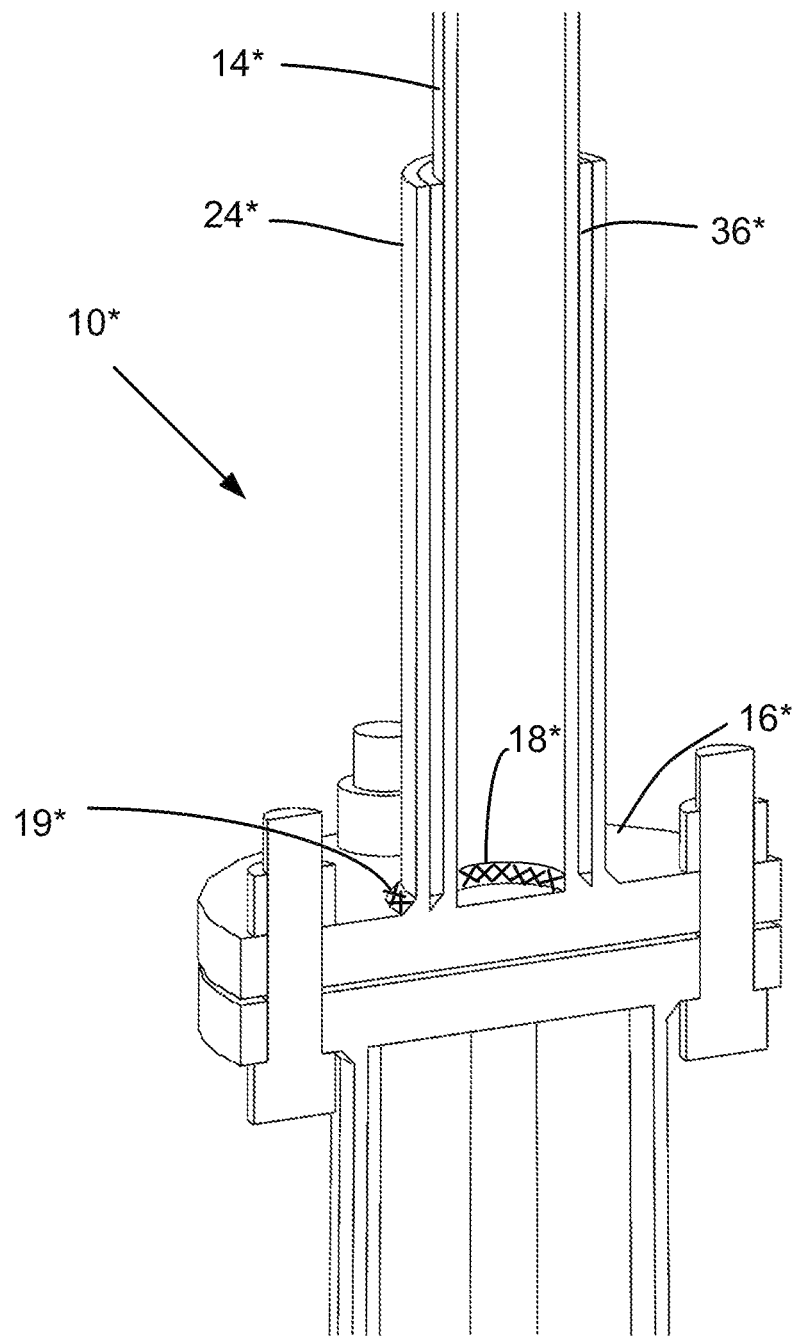
FIG. 7 is a section view along line 7-7 of FIG. 6.

FIGS. 6 and 7 show a second embodiment of a bracket arrangement 10* which is secured to the flange 16* by welding instead of by bolting. In this embodiment, an external tube or pipe 24* is welded to the flange 16*, with the pipe 24* being concentric with the static spike 14*. The pipe 24* serves as the bracket 10*. The weld joint 19* between the pipe 24* and the flange 16* is outside of the weld joint 18* between the static spike 14* and the flange 16*. The external pipe 24* has an inside diameter larger than the outside diameter of the static spike 14*, leaving a gap between the static spike 14* and the pipe 24*. Then the energy-absorbing element 36* is slid down over the spike 14* and into that gap, such that the energy-absorbing element 36 is snugly sandwiched between the spike 14* and the external pipe 24*. In a preferred embodiment, the gap between the spike 14* and the outer pipe 24* is almost equal to the thickness of the energy-absorbing element 36* (which, as indicated earlier, preferably is ¼" thick).

As was the case with the first embodiment 10, the ratio of the length of the outer pipe 24* relative to the length of the spike 14* is in the 5% to 15% range, with the most preferred length of the outer pipe 24* being 10% of the length of the spike 14*.

To aid in the correct placement of the outer pipe 24* relative to the static spike 14* (after the static spike 14* has been welded to the base flange 16* at the weld 18*), and to aid in the installation of the energy-absorbing element 36*, the installer may prefer to slide the energy-absorbing element 36* down the static spike 14* until the energy-absorbing element 36* is spaced a short distance above the base flange 16* (i.e. several inches above the base flange 16* so that the energy-absorbing element 36* will not be adversely affected by the heat resulting from welding the outer pipe 24* to the base flange 16*). Then, the installer may slide the outer pipe 24* over the spike 14* and over the energy-absorbing element 36* until the outer pipe 24* is resting on the base flange 16*. This will ensure that the outer pipe 24* is indeed concentric with the spike 14*. The installer then welds the outer pipe 24* to the base flange 16* to form the weld line 19* before completing the installation by pushing the energy-absorbing element 36* all the way down until the energy-absorbing element 36* rests upon the base flange 16* (as best shown in FIG. 7).

The pipe 24* lies snugly against the energy-absorbing element 36* surrounding the elongated pole element 14* at a first position at the distal end of the pipe 24*, which is spaced a first distance of 5% to 15% of the pole length from the weld area 18* in elongated direction. The proximal end of the pipe 24* is welded to the base flange 16* at a weld line 19* located outside of the weld line 18*.

Figure 8:
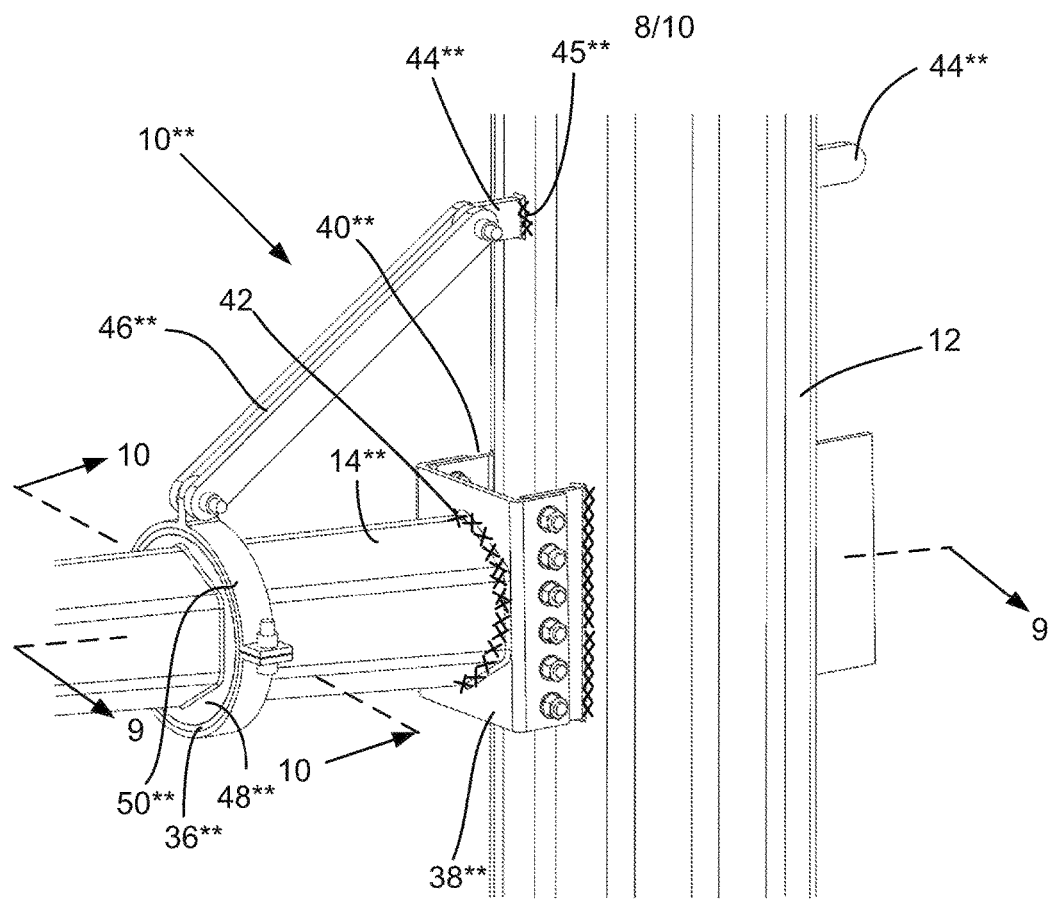
FIG. 8 is a perspective view of a third embodiment of a bracket arrangement, wherein the elongated element being supported by the bracket arrangement is an arm projecting off to the side of a base pole.
Figure 9:
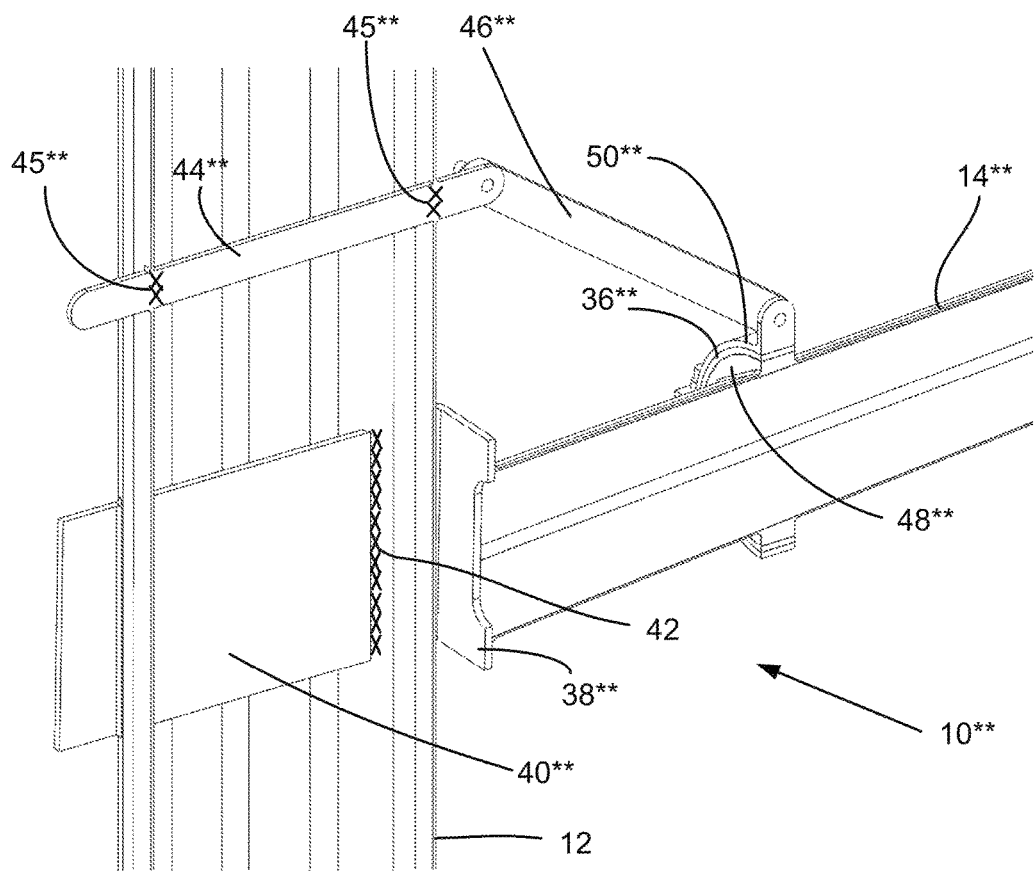
FIG. 9 is a section view along line 9-9 of FIG. 8.
Figure 10:
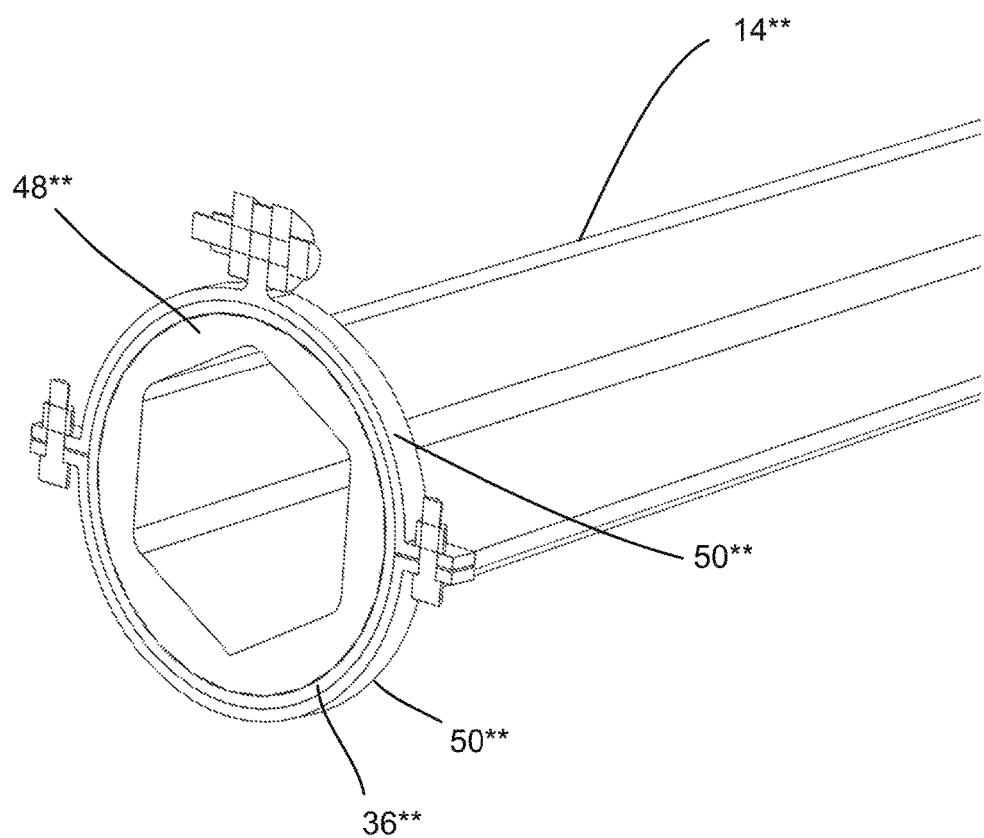
FIG. 10 is a section view along line 10-10 of FIG. 8.

FIGS. 8-10 show another embodiment of a bracket arrangement 10. In this instance, the elongated "spike" 14 is actually a hexagonal pole projecting laterally off to one side of a vertical base pole 12 and serving as an arm or appendage 14. As may be appreciated, the pole 14 is welded to a flange 38 which has sides at right angles to the base of the flange 38 that are bolted to brackets 40, which are welded to the base pole 12. As in the previous embodiments described earlier, wind-induced, vortex-shedding harmonic oscillations can result in stress cracking of the weld area 42 at the proximal end of the pole 14.

To attenuate this stress cracking problem, a bracket arrangement 10 can be installed (and even retrofitted) to support the pole 14. The bracket arrangement 10 includes an anchoring member 44, which is welded 45 to the base pole 12, a support arm 46, a hexagonal-to circular transition piece 48, two semi-cylindrical brackets 50, and an energy-absorbing element 36.

In this embodiment, the anchoring member 44 extends completely through the base pole 12 and projects out of the front and back sides of the base pole 12. The anchoring member 44 is welded to the base pole 12 at the points 45 where the anchoring member 44 projects through the base pole 12. The hexagonal-to-circular transition piece 48 has a hexagonal cross-section inner surface that fits snugly around the hexagonal pole 14 and may be welded to the pole 14 or may be held in place only by the two semi-cylindrical brackets 50 which are bolted together, clamping the transition piece 48 against the pole 14 and the energy-absorbing element 36 between the semi-cylindrical brackets 50 and the transition piece 48. It should be noted that the transition piece 48 may be a single piece as shown, or it may be two or more semi-circular pieces, similar to the two semi-cylindrical brackets 50, so as to facilitate the installation of the transition piece 48 onto the pole 14. The support arm 46 connects the two semi-cylindrical brackets 50 to the anchoring member 44 by being bolted at one end to one of the brackets 50 and at the other end to the anchoring member 44, as shown in FIGS. 8 and 9.

Thus, the bracket arrangement 10 provides a rigid member (the support arm 46) that is independently fixed at a first position (the position of the semi-cylindrical brackets 50) by means of a bolt and nut, spans across the weld line 42, and is independently fixed relative to the base flange 38 at a second position (the anchoring member 44) by means of a bolt and nut. By being independently fixed at the first and second positions, the rigid member may be unfixed at the first position, such as by removing the brackets 50 or the bolt that holds the support arm 46 to the brackets 50, without affecting the fixing at the second position. Similarly, the rigid member may be unfixed at the second position, such as by removing the bolt and nut securing it to the anchoring member 44, without affecting the fixing at the first position. It should be noted that the anchoring member 44 lies at a higher elevation than the semi-cylindrical brackets 50** and lies on the same side of the vertical pole 12 as the weld line 42.

The pole 14 is tapered, having a larger diameter at the proximal end, adjacent to the base flange 38, than at the distal end, so the transition piece 48 wedges against the pole 14, at a first point, where the diameter of the transition piece 48 matches the diameter of the pole 14

It should be noted that the bracket arrangement 10 connects, supports, strengthens, stiffens, and dampens the pole 14 by providing a brace that extends across the weld area 42. The brace is secured to the pole element 14 at a first point, where the transition piece 48, the energy-absorbing element 36, and the brackets 50 are located. The bracket arrangement 10 then extends to a second point 44 on the vertical pole 12 (which may be referred to as a base or a foundation). That second point is located outside the weld area 42 of the base flange 38. That is, the bracket arrangement 10 spans from a first point on the pole element 14 to a second point 44 outside the weld area 42 so as to attenuate any vibration observable at the weld area 42. This reduces or eliminates stress cracking of the weld and fatigue failure of the part.

It also should be noted that in the embodiment of FIGS. 2-5 and the embodiment of FIGS. 8-10, the energy-absorbing elements 36 and 36** terminate at the first position. There is no energy-absorbing element between the static spike and the remainder of the bracket extending between the first position and the second position.

While the embodiments described above show three means for supporting and stiffening a pole, it will be obvious to those skilled in the art that modifications may be made to the embodiments described above without departing from the scope of the present invention as claimed.

What is claimed is:

1. A bracket arrangement for supporting an elongated pole element mounted to a base element, comprising, an elongated pole element having a proximal end and a distal end and defining an elongated direction and a pole length from said proximal end to said distal end in said elongated direction, said proximal end of said elongated pole element being welded to a base flange along a weld line;
   an energy-absorbing element snugly surrounding said elongated pole element at a first position, said first position being spaced a first distance from said weld line in said elongated direction, said first distance being from 5% to 15% of said pole length;
   a bracket having a first end and a second end, said first end of said bracket snugly surrounding said energy-absorbing element at said first position; said bracket spanning from said first position to a second position located outside of said weld line such that said bracket spans across said weld line; and
   a fixed point at said second position, said fixed point being fixed relative to said base flange, wherein said bracket includes a rigid member that is independently fixed at said first position, spans across said weld line, and is independently fixed relative to said base flange at said second position,
   wherein said elongated pole element extends laterally from a vertical pole, said bracket is secured to said vertical pole at said second position, and said base element also is secured to said vertical pole, and wherein said second position lies on an anchoring member which extends through said vertical pole and is welded to said vertical pole, said second position being at a higher elevation than said first position and on the same side of the vertical pole as said weld line.

2. A bracket arrangement for supporting an elongated pole element mounted to a base element as recited in claim 1, wherein said energy-absorbing element is made of a visco-elastic polymer material.

3. A bracket arrangement for supporting an elongated pole element mounted to a base element as recited in claim 1, wherein said elongated pole element has a multi-sided outer surface, and further comprising a transition element snugly surrounding said elongated pole element at said first position, said transition element having a multi-sided inner surface which matches the multi-sided outer surface of said elongated pole element, said transition element also having a cylindrical outer surface, wherein said energy-absorbing element surrounds said cylindrical outer surface of said transition element at said first position, said energy-absorbing element lying between said transition element and said first end of said bracket.

4. A bracket arrangement for supporting an elongated pole element mounted to a base element as recited in claim 3, wherein said elongated pole element tapers outwardly from said distal end to said proximal end, and said inner surface of said transition element is sized to wedge against said elongated pole element at said first position.

\* \* \* \* \*